(12) United States Patent
Hefner et al.

(10) Patent No.: US 6,389,343 B1
(45) Date of Patent: May 14, 2002

(54) STEERING RESISTANCE DEVICE

(75) Inventors: Robert E. Hefner, Creve Coeur; Kevin Huang, Peoria; John J. Krone, Dunlap; Andrew H. Nippert, Peoria, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/676,930

(22) Filed: Sep. 29, 2000

(51) Int. Cl.$^7$ .............................. B62D 5/00; B62D 6/00
(52) U.S. Cl. ........................ 701/41; 180/443; 180/6.2
(58) Field of Search ........................ 701/41, 50, 42; 180/6.2, 6.44, 6.6, 234, 280, 400, 402, 443; 280/5.51, 263, 264

(56) References Cited

U.S. PATENT DOCUMENTS

| | | |
|---|---|---|
| 4,717,175 A | 1/1988 | Arai et al. |
| 4,771,846 A | 9/1988 | Venable et al. |
| 4,956,590 A | 9/1990 | Phillips |
| 5,181,173 A | 1/1993 | Avitan |
| 5,247,441 A | 9/1993 | Serizawa et al. |
| 5,248,009 A | 9/1993 | Takehara et al. |
| 5,267,625 A | 12/1993 | Shimizu |
| 5,423,391 A | 6/1995 | Shimizu |
| 5,517,096 A | 5/1996 | Shtarkman et al. |
| 5,717,590 A | 2/1998 | Mihalko |
| 5,779,013 A | 7/1998 | Bansbach |
| 5,828,971 A | 10/1998 | Diekhans et al. |
| 5,873,430 A | 2/1999 | Mueller et al. |
| 5,887,675 A | 3/1999 | Hackl et al. |
| 5,919,241 A | 7/1999 | Bolourchi et al. |
| 5,948,030 A * | 9/1999 | Miller et al. .................. 701/41 |
| 6,000,490 A | 12/1999 | Easton |
| 6,032,751 A | 3/2000 | Loichinger et al. |
| 6,041,887 A | 3/2000 | Kojo et al. |
| 6,050,360 A | 4/2000 | Pattock et al. |
| 6,062,336 A | 5/2000 | Amberkar et al. |
| 6,102,151 A | 8/2000 | Shimizu et al. |
| 6,176,083 B1 * | 1/2001 | Ikari .......................... 60/422 |

* cited by examiner

Primary Examiner—Yonel Beaulieu
(74) Attorney, Agent, or Firm—Clifton G. Green

(57) ABSTRACT

Apparatus and methods for controlling the resistance to the movement of a steering shaft that is operable to move as a function of an operator input. A position sensor is coupled with the steering shaft and transmits a shaft position signal as a function of the position of the steering shaft. A processing device is coupled with the position sensor to receive the shaft position signal and transmits a resistance signal as a function of the shaft position signal. A resistance device is coupled with the processing device to receive the resistance signal and is coupled with the steering shaft, the resistance device resists the movement of the steering shaft as a function of the resistance signal.

27 Claims, 2 Drawing Sheets

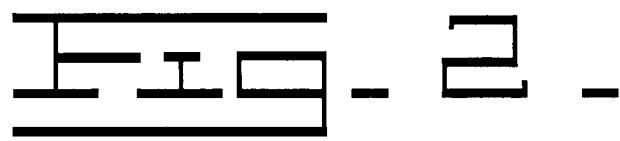
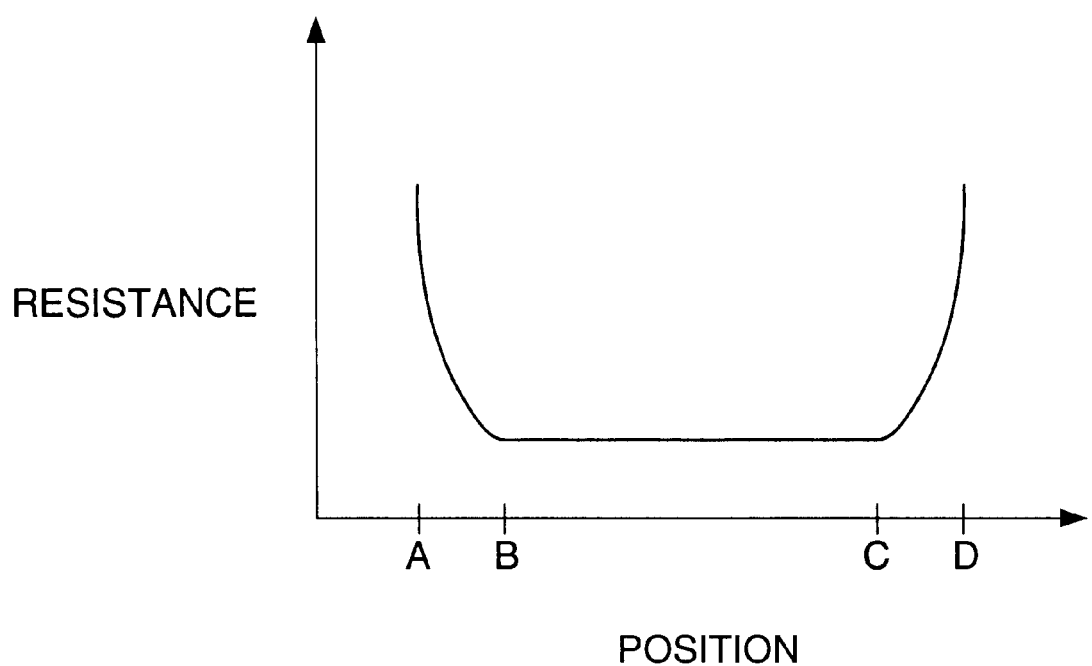

STEERING RESISTANCE DEVICE

TECHNICAL FIELD

This invention relates generally to electronic steering, and more particularly to a variable resistance system for electronic steering.

BACKGROUND

Conventional electronic steering uses a position sensor to detect the rotational position of a steering wheel. The position sensor transmits a position signal to an actuating device, e.g., a hydraulic pump or a microprocessor that controls the hydraulic pump in the case of electro-hydraulic steering systems, which then moves the wheels of the machine to the appropriate position. Often, conventional mechanical stops are coupled to the shaft of the steering wheel to prevent movement beyond a particular angle from the "straight ahead" steering position.

One problem with including a mechanical stop is that the amount of rotation of the steering wheel is determined at the time the machine having the steering wheel is assembled, and cannot be changed without substantial rework, if at all.

In addition, if different degrees of rotation are desired for the steering wheels of two machines in the same product line, e.g., wheel loaders, then multiple components must be stocked. This additional inventory increases the expense for the manufacturer.

A second problem with electro-type/electronic steering systems is that the resistance to movement of the steering wheel is in many cases, constant. Some electro-type/electronic steering systems increase the resistance as vehicle speed increases, and others increase the resistance as the difference between the commanded wheel position (from the steering wheel) and the actual wheel position, but little else is done to provide feedback or to affect the way the operator controls the steering wheel.

SUMMARY OF THE INVENTION

The present invention provides apparatus and methods for controlling the resistance to the movement of a steering shaft that is operable to move as a function of an operator input. A position sensor is coupled with the steering shaft and transmits a shaft position signal as a function of the position of the steering shaft. A processing device is coupled with the position sensor to receive the shaft position signal and transmits a resistance signal as a function of the shaft position signal. A resistance device is coupled with the processing device to receive the resistance signal and is coupled with the steering shaft, the resistance device resists the movement of the steering shaft as a function of the resistance signal.

BRIEF DESCRIPTION OF THE DRAWINGS

FIG. 2 is a graph of resistance of the resistance device versus position of the steering shaft according to one embodiment of the invention.

DETAILED DESCRIPTION

Figure 1:
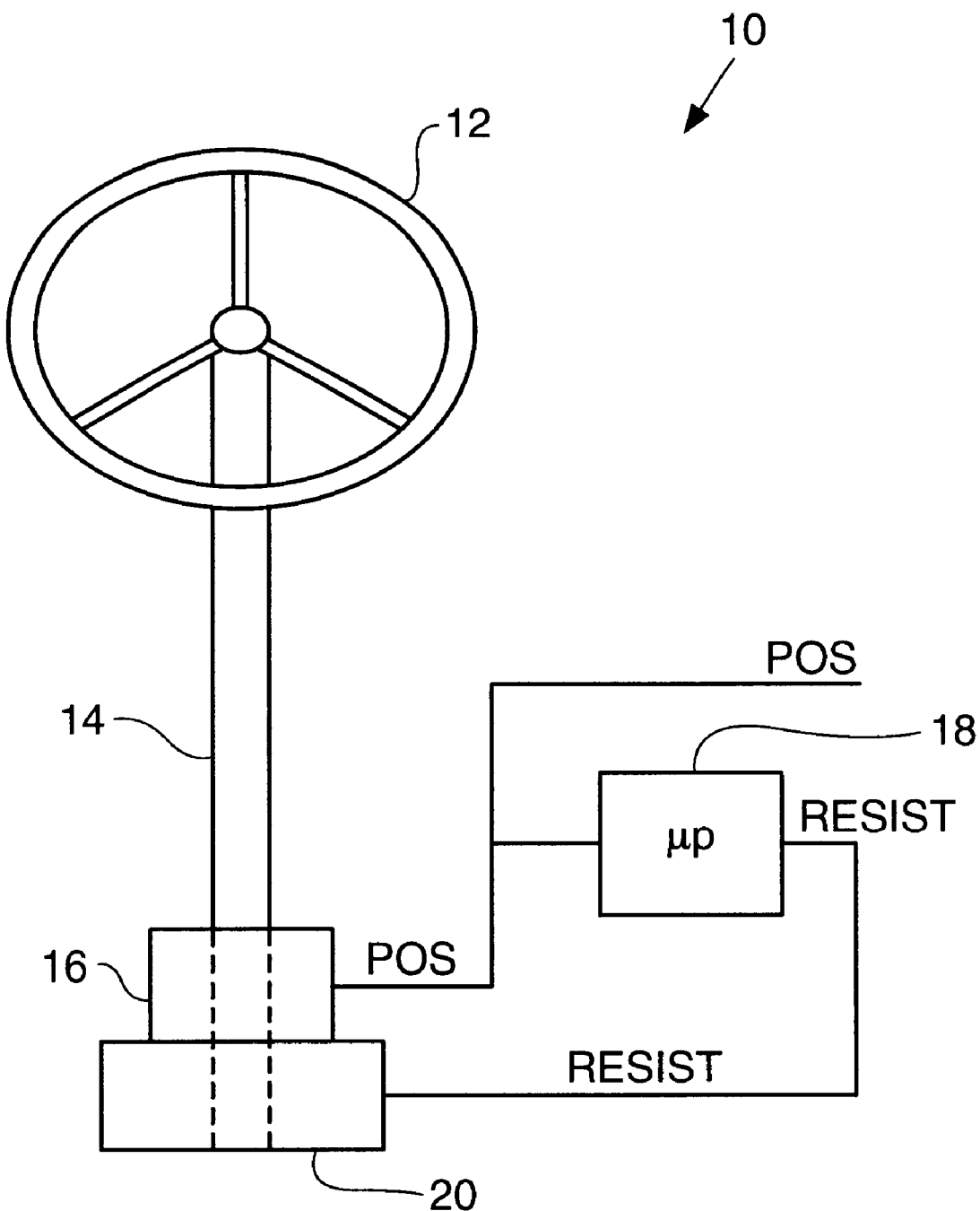
FIG. 1 is a functional block diagram of a steering system according to one embodiment of the invention.

FIG. 1 is a functional block diagram of a steering resistance system 10 according to one embodiment of the invention. The steering resistance system 10 includes a steering input device, such as a steering wheel 12 that moves as a function of an operator input. Other types of input devices known to those skilled in the art, such as a portion of a steering wheel (not shown), a steering yoke (not shown), or a lever (not shown), could also be used. A steering shaft 14 is typically coupled with the steering wheel 12. Although the steering shaft 14 shown rotates as a function of the operator input, e.g., turning the steering wheel 12, in other embodiments of the invention the steering shaft 14 may translate.

A position sensor 16, such as a rotary or linear position sensor, is coupled with the steering shaft 14 and transmits a shaft position signal ("POS") as a function of the position of the steering shaft 14. The position sensor 16 may be any of a variety of appropriate sensors known to those skilled in the art.

In one embodiment of the invention, the position sensor 16 may track both the specific steering shaft 14 position and the number of revolutions of the steering shaft 14 from a predetermined position, such as a starting or "straight ahead" position. Thus, steering positions of greater than 360 degrees could be tracked, and the shaft position signal POS for a steering shaft 14 position of ten degrees would be different than the shaft position signal POS for steering shaft position of three hundred and seventy degrees.

A processing device 18, such as a microprocessor or controller, is coupled with the position sensor 16 to receive the shaft position signal POS. The processing device 18 may be any of a variety of appropriate devices known to those skilled in the art. The processing device 18 transmits a resistance signal ("RESIST") as a function of the shaft position signal POS.

The shaft positions signal POS may also be used for other purposes, such as an input to an electronic steering system (not shown) of a type known to those skilled in the art.

The resistance signal RESIST may be a function of the shaft position signal POS at a single instance in time, or it may be a function of the shaft position signal POS at multiple instances in time, or it may be a function of the shaft velocity at any instance in time. For example, the resistance signal RESIST may be a function of the rate of change of the shaft position signal POS, e.g., the velocity or acceleration, or it may be a function of the average of the shaft position signal POS over a given time period, or some other appropriate function known to those skilled in the art.

A resistance device 20 is coupled with the processing device 18 to receive the resistance signal RESIST. The resistance device 20 is also coupled with the steering shaft 14, and resists movement of the steering shaft 14 as a function of the resistance signal RESIST.

The resistance device 20 may be any of a variety of appropriate devices known to those skilled in the art. For example, it may be a fluid brake, such as a magneto-rheological or electro-rheological fluid brake, a motor, such as an electric motor, a magnetic particle brake, a hysteresis brake, a constant magnetic brake, a friction brake, or some combination thereof. A noteworthy characteristic of these devices is that in many cases they may be used to resist the motion of the steering shaft 14 when the steering shaft 14 is in any position.

In one embodiment of the invention, the processing device 18 may transmit a resistance signal RESIST that causes the resistance device 20 to increase the resistance to the movement of the steering shaft 14 as the steering shaft 14 approaches a predetermined position or positions.

In this and other embodiments of the invention, the processing device 18 may cause the resistance to increase linearly, exponentially, or by any of a variety of appropriate functions known to those skilled in the art. Similarly, in certain embodiments of the invention, the processing device 18 may cause the resistance to decrease rather than increase.

In one embodiment of the invention, the processing device 18 may transmit a resistance signal RESIST that causes the resistance device 20 to vary the resistance so as to cause a pulsing effect. For example, as the position of the steering shaft 14 approaches a predetermined position the resistance may rapidly decrease, followed by a rapid increase as the steering shaft 14 continues to move towards the predetermined position.

FIG. 2 is a graph 30 of resistance of the resistance device 20 versus position of the steering shaft 14 according to one embodiment of the invention. At point A, such as the steering wheel 12 being turned fully to the left, the resistance is a relatively high value. As the steering shaft 14 is turned towards the right, the resistance decreases, until a predetermined value is reached at point B.

The resistance remains constant until the steering shaft 14 reaches point C, i.e., a predetermined distance shy of point D (point D being, for example, where the steering wheel 12 is turned fully to the right). When the steering shaft 14 reaches point C, the resistance increases until it reaches a relatively high value at point D.

The graph of FIG. 2 may be used to create virtual stops for the steering shaft 14. In one embodiment of the invention, the resistance of the resistance device 12 may be sufficiently high as the position of the steering shaft 14 approaches points A and D to prevent movement of the steering shaft 14 beyond the respective points. Even if the resistance does not prevent movement beyond points A and D, the increasing resistance as the steering shaft 14 approaches points A and D will tend to discourage movement of the steering shaft 14 further towards those points (A and D).

In one embodiment of the invention, the processing device 18 may transmit a resistance signal RESIST that causes the resistance device 20 to increase the resistance to movement of the steering shaft 14 as the velocity of the movement of the steering shaft 14 increases.

Similarly, in one embodiment of the invention the processing device 18 may transmit the resistance signal RESIST that causes the resistance device 20 to increase the resistance to movement of the steering shaft 14 when the velocity of the steering shaft 14 exceeds a predetermined value. In this embodiment of the invention, an operator would be discouraged from turning the steering wheel 12 faster than a preset rate by the increased resistance.

In one embodiment of the invention, the processing device 18 may use several or all of the techniques described herein to determine the resistance signal RESIST. For example, the resistance signal RESIST may be dependent on the position and the velocity of the steering shaft, and even the direction of the movement.

INDUSTRIAL APPLICABILITY

The steering resistance system 10 described herein may be used in a variety of applications. For example, it could be used on an articulated machine, such as a wheel loader, to limit the motion of the steering wheel 12 to a particular range of travel, e.g., the virtual stops. In one embodiment of the invention, these virtual stops could be calibrated to the maximum desired degree of articulation of the wheel loader.

Similarly, the resistance to movement of the steering wheel 12 could increase as the degree of articulation of the machine approaches its maximum capability, e.g., as it approaches the vehicle's frame stops. This may be done based either on the position of the steering shaft 14 or using feedback from a sensor (not shown) indicative of the angle of the vehicle's wheels or angle of articulation. In the latter embodiments of the invention, the processing device 18 may receive the signal from the additional sensor and use it to determine the resistance signal RESIST.

In one embodiment of the invention, as the frame stop is approached, the resistance device 20, controlled by the processing device 18, generates a pulsing resistance to the movement of the steering shaft 14. This can be done, for example, by rapidly increasing and decreasing the resistance. If the operator stops turning the steering wheel 12 in a direction that causes the machine to continue towards the frame stop, or turns the steering wheel 12 in a direction that causes the machine to move away from the frame stop, the resistance device 20 produces a non-pulsing resistance.

The resistance could also increase if the operator commands a steering rate in excess of the machine's inherent maximum rate or degree of articulation or steering, or in excess of the maximum flow rate of a pump controlling the articulation or steering.

Because the steering resistance system 10 can also be calibrated to allow a particular range of travel for the steering wheel 12, it is not necessary to have mechanical stops on the steering shaft 14. Thus, a single steering resistance system 10 can be programmed to allow whatever range of travel is desired, and the need to stock multiple systems may be avoided.

From the foregoing it will be appreciated that, although specific embodiments of the invention have been described herein for purposes of illustration, various modifications may be made without deviating from the spirit and scope of the invention. For example, although the invention is described with respect to articulated vehicles, it could also be applied to the steering systems of non-articulated vehicles. Accordingly, the invention is not limited except as by the appended claims.

What is claimed is:

1. An apparatus for controlling the resistance to the movement of a steering shaft that is operable to move as a function of an operator input, the apparatus comprising;
   a position sensor coupled with the steering shaft and operable to transmit a shaft position signal as a function of the position of the steering shaft;
   a processing device coupled with the position sensor to receive the shaft position signal and operable to transmit a resistance signal as a function of the shaft position signal; and
   a resistance device coupled with the processing device to receive the resistance signal and coupled with the steering shaft, the resistance device operable to resist the movement of the steering shaft as a function of the resistance signal.

2. The apparatus of claim 1 wherein the steering shaft is operable to rotate as a function of the operator input.

3. The apparatus of claim 1 wherein the steering shaft is operable to translate as a function of the operator input.

4. The apparatus of claim 1 wherein the shaft position signal is a function of the shaft position and the number of revolutions of the shaft from a predetermined position.

5. The apparatus of claim 1 wherein the resistance signal is a function of the rate of change of the shaft position signal.

6. The apparatus of claim 1 wherein the processing device is operable to transmit a resistance signal operable to cause the resistance device to increase the resistance to the movement of the steering shaft as the velocity of the steering shaft increases.

7. The apparatus of claim 1 wherein the processing device is operable to transmit a resistance signal that causes the resistance device to increase the resistance to the movement of the steering shaft when the velocity of the steering shaft exceeds a predetermined value.

8. The apparatus of claim 7 wherein the predetermined value corresponds to at least one of a maximum flow rate of a steering pump and a maximum rate of change of articulation of a work machine.

9. The apparatus of claim 1 wherein the resistance device is operable to one of increase the resistance as the shaft approaches a first predetermined position and decrease the resistance as the shaft approaches a first predetermined position.

10. The apparatus of claim 1 wherein the resistance device is operable to decrease the resistance when the movement of the shaft is substantially zero.

11. The apparatus of claim 1 wherein the resistance device is operable to rapidly increase and decrease the resistance as the shaft approaches a first predetermined position.

12. The apparatus of claim 9 wherein the first predetermined position corresponds to a predetermined degree of articulation of a work machine.

13. The apparatus of claim 1 wherein the processing device is operable to transmit a resistance signal operable to cause the resistance device to substantially prevent the movement of the steering shaft as the steering shaft approaches a predetermined position.

14. The apparatus of claim 1 wherein the processing device is operable to be transmit one of a resistance signal operable to cause the resistance device to have a relatively high resistance as the steering shaft approaches a first position and a second position and a resistance signal operable to cause the resistance device to have a relatively high resistance as the steering shaft approaches a third position and a fourth position.

15. The apparatus of claim 1 wherein the resistance device comprises one of a fluid brake, a motor, a magnetic particle brake, a hysteresis brake, a constant magnetic brake, and a friction brake.

16. The apparatus of claim 1 further comprising a steering device coupled with the steering shaft, movement of the steering device operable to cause a corresponding movement of the steering shaft.

17. The apparatus of claim 1 wherein the steering device comprises one of a steering wheel, a portion of a steering wheel, a yoke, and a lever.

18. An apparatus for controlling the resistance to the movement of a steering shaft that is operable to move as a function of an operator input, the apparatus comprising;

a position sensor coupled with the steering shaft and operable to transmit a shaft position signal as a function of the position of the steering shaft;

a processing device coupled with the position sensor to receive the shaft position signal and operable to transmit a resistance signal as a function of the shaft position signal; and a resistance device coupled with the processing device to receive the resistance signal and coupled with the steering shaft, the resistance device operable to resist the movement of the steering shaft as a function of the resistance signal, the processing device operable to operate in a first mode and a second mode, in the first mode the processing device being operable to transmit a resistance signal that substantially prevents movement by the steering shaft beyond a first position when the shaft is moved in a first direction and beyond a second position when the shaft is moved in a second direction, and in the second mode the processing device being operable to transmit a resistance signal that substantially prevents movement by the steering shaft beyond a third position when the shaft is moved in the first direction and beyond a fourth position when the shaft is moved in the second direction.

19. The apparatus of claim 18 wherein the resistance device comprises one of a fluid brake, a motor, a magnetic particle brake, a hysteresis brake, a constant magnetic brake, and a friction brake.

20. The apparatus of claim 18 wherein the first, second, third, and fourth positions are respective infinitely variable points along the shaft.

21. A method for resisting movement of a steering shaft, comprising:

determining a position of the steering shaft; and applying a force operable to resist movement of the steering shaft as a function of the position of the steering shaft.

22. The method of claim 21 wherein the force is of a magnitude sufficient to substantially prevent movement of the shaft in a first predetermined direction when the shaft is in a first predetermined position.

23. The method of claim 21 wherein the force is of a magnitude sufficient to substantially prevent movement of the shaft in a second predetermined direction when the shaft is in a second predetermined position.

24. The method of claim 21 wherein determining the position of the steering shaft comprises determining the position of the steering shaft at a first and second instances in time, and wherein applying a force operable to resist movement of the steering shaft as a function of the position of the steering shaft comprises applying a force as a function of the rate of change of the position of the steering shaft.

25. The method of claim 24 wherein the force operable to resist the movement of the steering shaft increases as the rate of change of the position of the steering shaft increases.

26. The method of claim 24 wherein the force operable to resist the movement of the steering shaft increases when the rate of change of the position of the steering shaft exceeds a predetermined value.

27. The method of claim 21 the force operable to resist the movement of the steering shaft increases when the shaft approaches a first predetermined position.

* * * * *